(12) United States Patent
Wheeler et al.

(10) Patent No.: US 8,866,852 B2
(45) Date of Patent: Oct. 21, 2014

(54) METHOD AND SYSTEM FOR INPUT DETECTION

(75) Inventors: Aaron Joseph Wheeler, San Francisco, CA (US); Alejandro Kauffmann, San Francisco, CA (US); Liang-Lu (Tom) Chi, San Francisco, CA (US); Max Braun, San Francisco, CA (US)

(73) Assignee: Google Inc., Mountain View, CA (US)

( * ) Notice: Subject to any disclaimer, the term of this patent is extended or adjusted under 35 U.S.C. 154(b) by 151 days.

(21) Appl. No.: 13/305,500

(22) Filed: Nov. 28, 2011

(65) Prior Publication Data

US 2013/0135353 A1 May 30, 2013

(51) Int. Cl.
*G09G 5/00* (2006.01)

(52) U.S. Cl.
USPC .............................. 345/648; 345/8

(58) Field of Classification Search
CPC .................. G02B 27/017; G06F 3/011; G06F 2200/1637
See application file for complete search history.

(56) References Cited

U.S. PATENT DOCUMENTS

| | | | |
|---|---|---|---|
| 5,781,165 A * | 7/1998 | Tabata | 345/8 |
| 5,905,525 A * | 5/1999 | Ishibashi et al. | 348/39 |
| 6,388,638 B2 * | 5/2002 | Fukushima et al. | 345/7 |
| 6,396,497 B1 | 5/2002 | Reichlen | |
| 6,603,491 B2 | 8/2003 | Lemelson | |
| 7,825,996 B2 * | 11/2010 | Yamada et al. | 345/8 |
| 2007/0057911 A1 | 3/2007 | Fateh | |
| 2008/0088646 A1 * | 4/2008 | Sako et al. | 345/647 |
| 2008/0276196 A1 | 11/2008 | Tang | |
| 2010/0259471 A1 * | 10/2010 | Takano et al. | 345/156 |
| 2011/0227812 A1 | 9/2011 | Haddick | |

FOREIGN PATENT DOCUMENTS

| | | |
|---|---|---|
| JP | 08-202281 | 8/1996 |
| JP | 2009-122476 | 6/2009 |
| JP | 2009-294372 | 12/2009 |
| JP | 2010-062815 | 3/2010 |
| JP | 2010-205214 | 9/2010 |

OTHER PUBLICATIONS

Laszlo et al., "Visual Touchpad: A Two-handed Gestural Input Device," ICMI'04, Oct. 13-15, 2004, State College, Pennsylvania.*
Cakmakei, Orzan & Rolland, Jannick, Head-Worn Displays: A Review, Sep. 2006.

\* cited by examiner

*Primary Examiner* — Kee M Tung
*Assistant Examiner* — Nicholas R Wilson
(74) *Attorney, Agent, or Firm* — McDonnell Boehnen Hulbert & Berghoff LLP

(57) ABSTRACT

Methods and devices for applying at least one manipulative action to a selected content object are disclosed. In one aspect, a head-mounted-device (HMD) system includes at least one processor and data storage with user-interface logic executable by the at least one processor to apply at least one manipulative action to a displayed content object based on received data that indicates a first direction in which the HMD is tilted and an extent to which the HMD is tilted in the first direction. The at least one manipulative action is applied to a degree corresponding to the indicated extent to which the HMD is tilted in the first direction.

34 Claims, 14 Drawing Sheets

METHOD AND SYSTEM FOR INPUT DETECTION

BACKGROUND

Unless otherwise indicated herein, the materials described in this section are not prior art to the claims in this application and are not admitted to be prior art by inclusion in this section.

Augmented reality generally refers to a real-time view of a real-world environment that is augmented with additional content. A user may experience augmented reality through the use of a computing device. Such a computing device may be configured to provide the real-time view of the environment, either by allowing a user to directly view the environment or by allowing the user to indirectly view the environment by generating and displaying a real-time representation of the environment.

Further, the computing device may be configured to generate the additional content. The additional content may include, for example, a user-interface through which the user may interact with the computing device. The computing device may overlay the view of the environment with the user-interface (or other such additional content), such that the user sees the view of the environment and the user-interface at the same time.

SUMMARY

Certain wearable computing devices allow for display of content objects, such as an email inbox, picture, document, map, etc. Other examples of such content objects exist as well. However, different users may have different preferences; and thus, one manner of displaying content objects may not be suitable for every user. Therefore, a means of applying one or more manipulative actions to a selected content object is desired.

Disclosed herein is a head-mounted-device (HMD) configured to apply one or more manipulative actions to a selected content object. In one embodiment, the HMD system may include at least one processor and data storage with user-interface logic executable by the at least one processor to (i) receive data that indicates a first direction in which the HMD is tilted, (ii) receive data that indicates an extent to which the HMD is tilted in the first direction, and (iii) based on the indicated first direction, apply at least one manipulative action to a displayed content object. Further, the at least one manipulative action may be applied to a degree corresponding to the indicated extent to which the HMD is tilted in the first direction. Moreover, the at least one manipulative action may comprise at least one of: (a) zooming the displayed content object, (b) scrolling the displayed content object, (c) panning within the displayed content object, (d) enlarging the displayed content object, (e) shrinking the displayed content object, (f) rotating the displayed content object, and (g) cycling between displaying content objects that are associated together with a group of content objects.

In another embodiment, the HMD system may include at least one processor and data storage with user-interface logic executable by the at least one processor to (i) receive data that indicates a first direction in which the HMD is tilted, (i) receive data that indicates a second direction in which the HMD is tilted, (ii) receive data that indicates an extent to which the HMD is tilted in the first direction, (iii) receive data that indicates an extent to which the HMD is tilted in the second direction, (iv) based on the indicated first direction, apply at least one first manipulative action to a displayed content object, and (v) based on the indicated second direction, apply at least one second manipulative action to the displayed content object. In addition, the at least one first manipulative action may be applied to a degree corresponding to the indicated extent to which the HMD is tilted in the first direction and the at least one second manipulative action may be applied to a degree corresponding to the indicated extent to which at least a portion of the HMD is tilted in the second direction.

In another embodiment, the HMD system may include at least one processor and data storage with user-interface logic executable by the at least one processor to (i) detect an extent to which a head-mounted-device (HMD) is tilted in a first direction, make a first determination that the detected extent is greater than or equal to a threshold extent and that the detected extent is not greater than or equal to a second threshold extent, (ii) based on the first determination, apply a first manipulative action to a displayed content object, (iii) make a second determination that the detected extent is greater than or equal the second threshold extent, and (iv) based on the second determination, display the displayed content object with no manipulative action. In addition, the first manipulative action may be applied to a degree corresponding to the detected extent to which the HMD is tilted in the first direction.

In another embodiment, a non-transitory computer readable medium (CRM) is disclosed. This CRM has stored thereon instructions executable by a computing device to cause the computing device to perform functions, which may include (i) receiving data that indicates a first direction in which the HMD is tilted, (ii) receiving data that indicates an extent to which at least a portion of the HMD is tilted in the first direction, and (iii) based on the indicated first direction, applying at least one first manipulative action to a displayed content object. The functions may further include applying the at least one manipulative action to a degree corresponding to the indicated extent to which the HMD is tilted in the first direction. Moreover, the at least one manipulative action may comprise at least one of: (a) zooming the displayed content object, (b) scrolling the displayed content object, (c) panning within the displayed content object, (d) enlarging the displayed content object, (e) shrinking the displayed content object, (f) rotating the displayed content object, and (g) cycling between displaying content objects that are associated together with a group of content objects.

Finally, a method is disclosed. The method includes (i) receiving data that indicates a first direction in which a head-mounted device (HMD) is tilted, (i) receiving data that indicates a second direction in which the HMD is tilted, (ii) receiving data that indicates an extent to which the HMD is tilted in the first direction, (iii) receiving data that indicates an extent to which the HMD is tilted in the second direction, (iv) based on the indicated first direction, applying at least one first manipulative action to a displayed content object, and (v) based on the indicated second direction, applying at least one second manipulative action to the displayed content object. In addition, the at least one first manipulative action may be applied to a degree corresponding to the indicated extent to which the HMD is tilted in the first direction and the at least one second manipulative action may be applied to a degree corresponding to the indicated extent to which at least a portion of the HMD is tilted in the second direction.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. INTRODUCTION

Disclosed herein are various ways to manipulate objects that are displayed via a wearable computing device. As mentioned above, different users often have different preferences regarding how they prefer objects to be displayed via such a device. Therefore, it is advantageous to provide a mechanism to apply certain visual manipulations. By way of example, such visual manipulations may include, scrolling, rotating, and zooming. In addition, it is also advantageous to provide a mechanism for applying these visual manipulations in an efficient and convenient manner.

Accordingly, one way to apply a visual manipulation to an object may involve tilting the wearable computing device in a certain direction. Tilting the device in one direction may trigger the device to apply one type of visual manipulation. Further, tilting the device in another direction may trigger the device to apply another, different visual manipulation.

Moreover, tilting the device to a relatively greater extent may trigger the device to apply the visual manipulation relatively faster. Likewise, tilting the device to a relatively lesser extent may trigger the device to apply the visual manipulation relatively slower.

Further, any direction of tilt may be used to trigger any desired visual manipulation. For example, tilting the device in two (or more) directions may trigger the device to apply two (or more) different visual manipulations. Such visual manipulations may be applied either simultaneously or sequentially.

While certain aspects of the disclosure herein are briefly described above, this is for purposes of explanation only and should not be taken to be limiting. Additional features and functionality will become apparent to those skilled in the art given the entirety of this disclosure.

2. EXAMPLE SYSTEM AND DEVICE ARCHITECTURE

Figure 1A:
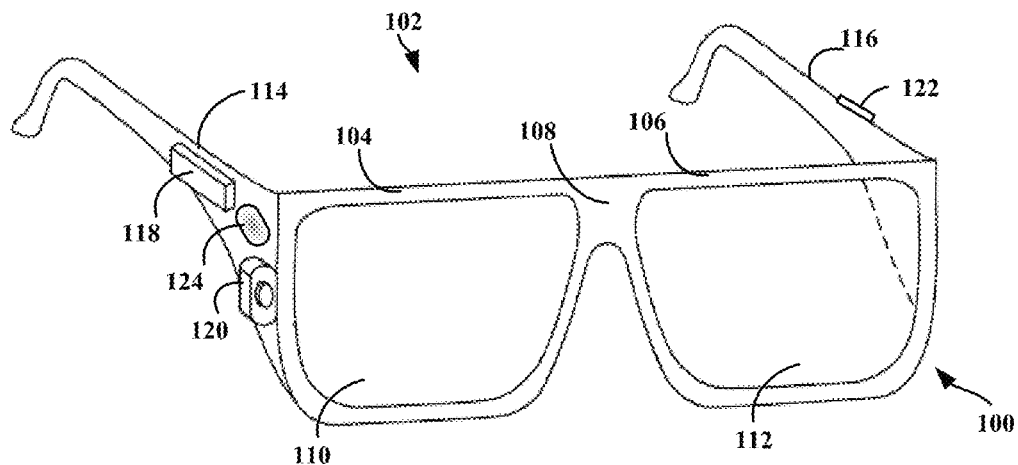
FIG. 1A illustrates an example system for receiving, transmitting, and displaying data.

FIG. 1A illustrates an example system 100 for receiving, transmitting, and displaying data. The system 100 is shown in the form of a wearable computing device. While FIG. 1A illustrates a head-mounted device 102 as an example of a wearable computing device, other types of wearable computing devices could additionally or alternatively be used. As illustrated in FIG. 1A, the head-mounted device 102 has frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected by wires or wirelessly connected to the head-mounted device 102). The on-board computing system 118 may include a processor and memory, for example. The on-board computing system 118 may be configured to receive and analyze data from the video camera 120, the sensor 122, and the finger-operable touch pad 124 (and possibly from other sensory devices, user-interfaces, or both) and generate images for output by the lens elements 110 and 112. The on-board computing system 118 may additionally include a speaker or a microphone for user input (not shown). An example computing system is further described below in connection with FIG. 4.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example embodiment of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
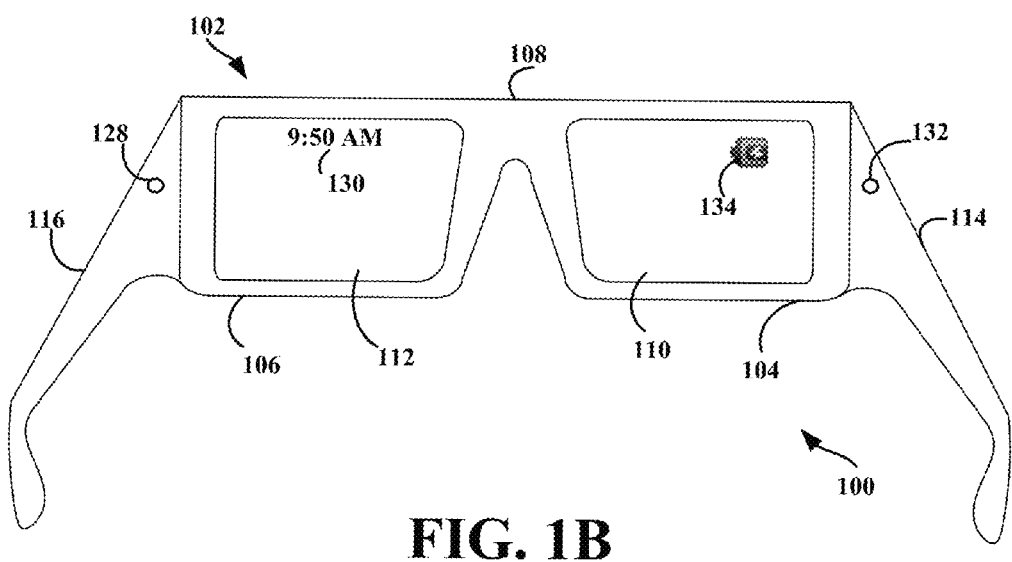
FIG. 1B illustrates an alternate view of the system illustrated in FIG. 1A.

FIG. 1B illustrates an alternate view of the system 100 illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may be omitted (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. Other possibilities exist as well.

Figure 2A:
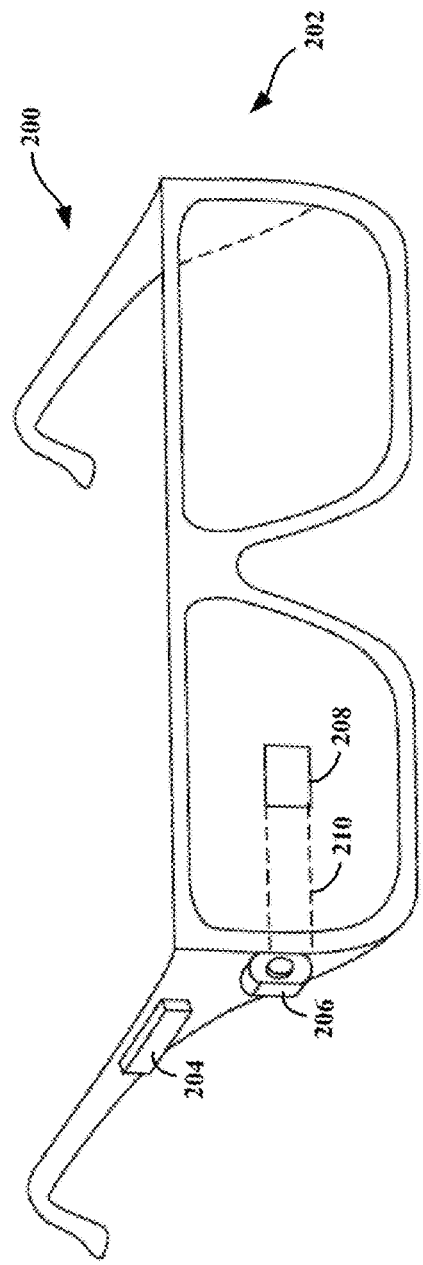
FIG. 2A illustrates an example system for receiving, transmitting, and displaying data.

FIG. 2A illustrates an example system 200 for receiving, transmitting, and displaying data. The system 200 is shown in the form of a wearable computing device 202. The wearable computing device 202 may include frame elements and side-arms such as those described with respect to FIGS. 1A and 1B. The wearable computing device 202 may additionally include an on-board computing system 204 and a video camera 206, such as those described with respect to FIGS. 1A and 1B. The video camera 206 is shown mounted on a frame of the wearable computing device 202; however, the video camera 206 may be mounted at other positions as well.

As shown in FIG. 2A, the wearable computing device 202 may include a single display 208 which may be coupled to the device. The display 208 may be formed on one of the lens elements of the wearable computing device 202, such as a lens element described with respect to FIGS. 1A and 1B, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 2B:
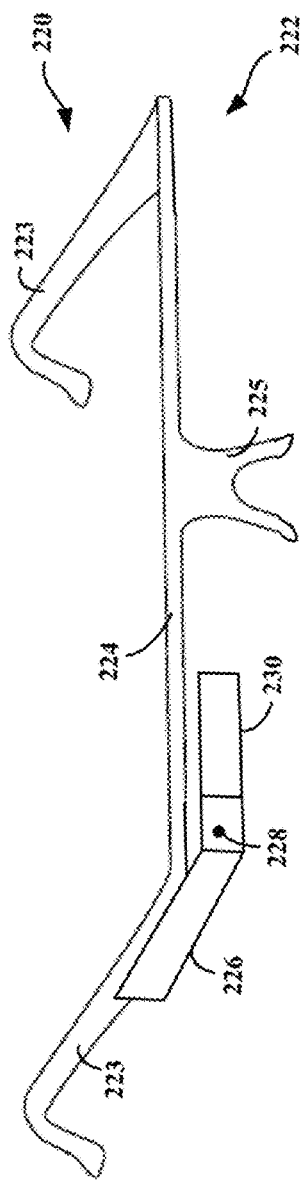
FIG. 2B illustrates an example system for receiving, transmitting, and displaying data.

FIG. 2B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 2B, the center frame support 224 connects the side-arms 223. The wearable computing device 222 does not include lens-frames containing lens elements. The wearable computing device 222 may additionally include an on-board computing system 226 and a video camera 228, such as those described with respect to FIGS. 1A and 1B.

The wearable computing device 222 may include a single lens element 230 that may be coupled to one of the side-arms 223 or the center frame support 224. The lens element 230 may include a display such as the display described with reference to FIGS. 1A and 1B, and may be configured to overlay computer-generated graphics upon the user's view of the physical world. In one example, the single lens element 230 may be coupled to a side of the extending side-arm 223.

The single lens element 230 may be positioned in front of or proximate to a user's eye when the wearable computing device 222 is worn by a user. For example, the single lens element 230 may be positioned below the center frame support 224, as shown in FIG. 2B.

Figure 3:
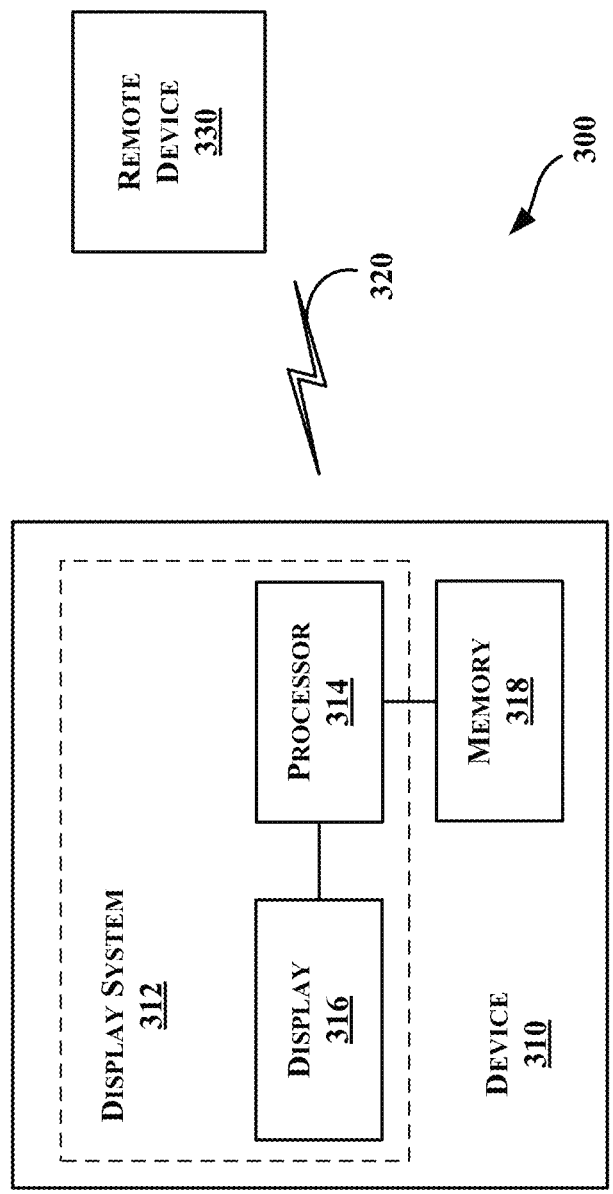
FIG. 3 shows a simplified block diagram of an example computer network infrastructure.

FIG. 3 shows a simplified block diagram of an example computer network infrastructure. In system 300, a device 310 communicates, using a communication link 320 (e.g., a wired or wireless connection), with a remote device 330. The device 310 may be any type of device that can receive data and display information corresponding to or associated with the data. For example, the device 310 may be a heads-up display system, such as the head-mounted device 102, 200, or 220 described with reference to FIGS. 1A-2B.

Thus, the device 310 may include a display system 312 comprising a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. In addition, remote device 330 may be any type of server device or cluster of server devices, such as a cloud-based server or a cloud-based server cluster. In embodiments in which remote device 330 is a cluster of server devices, such server devices may be connected by a local cluster network. In any event, the remote device 330 and the device 310 may contain hardware to enable the communication link 320, such as processors, transmitters, receivers, antennas, etc.

In FIG. 3, the communication link 320 is illustrated as a wireless connection; however, wired connections may also be used. For example, the communication link 320 may be a wired serial bus such as a universal serial bus or a parallel bus, among other connections. The communication link 320 may also be a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. Either of such a wired and/or wireless connection may be a proprietary connection as well. The remote device 330 may be accessible via the Internet and may include a computing cluster associated with a particular web service (e.g., social-networking, photo sharing, address book, etc.).

Figure 4:
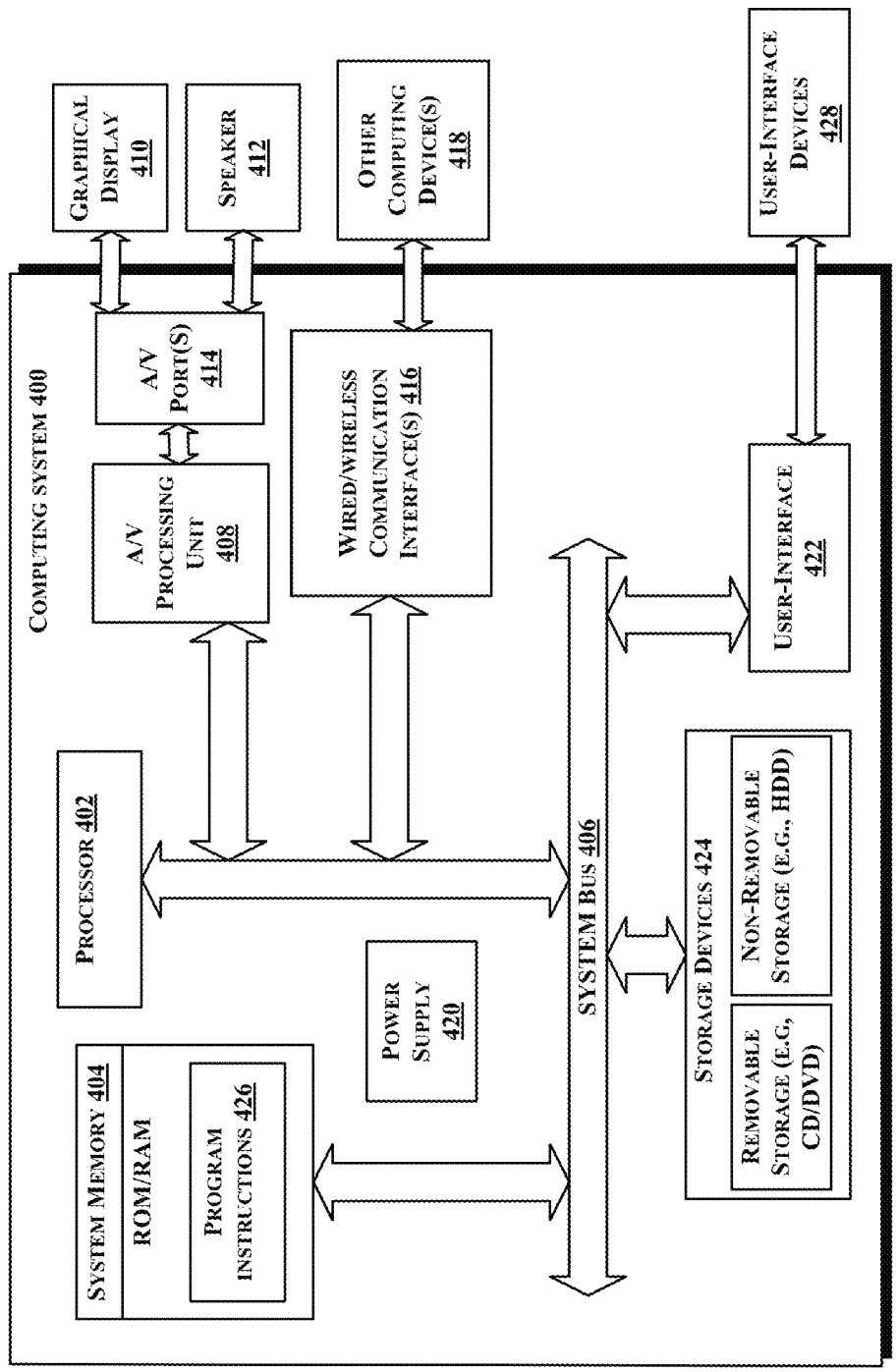
FIG. 4 shows a simplified block diagram depicting example components of an example computing system.

As described above in connection with FIGS. 1A-2B, an example wearable computing device may include, or may otherwise be communicatively coupled to, a computing system, such as computing system 118 or computing system 204. FIG. 4 shows a simplified block diagram depicting example components of an example computing system 400. One or both of the device 310 and the remote device 330 may take the form of computing system 400.

Computing system 400 may include at least one processor 402 and system memory 404. In an example embodiment, computing system 400 may include a system bus 406 that communicatively connects processor 402 and system memory 404, as well as other components of computing system 400. Depending on the desired configuration, processor 402 can be any type of processor including, but not limited to, a microprocessor (µP), a microcontroller (µC), a digital signal processor (DSP), or any combination thereof. Furthermore, system memory 404 can be of any type of memory now known or later developed including but not limited to volatile memory (such as RAM), non-volatile memory (such as ROM, flash memory, etc.) or any combination thereof.

An example computing system 400 may include various other components as well. For example, computing system 400 includes an A/V processing unit 408 for controlling graphical display 410 and speaker 412 (via A/V port 414), one or more communication interfaces 416 for connecting to other computing devices 418, and a power supply 420. Graphical display 410 may be arranged to provide a visual depiction of various input regions provided by user-interface module 422. For example, user-interface module 422 may be configured to provide a user-interface, such as the example user-interface described below in connection with FIGS. 5A-D, and graphical display 410 may be configured to provide a visual depiction of the user-interface. User-interface module 422 may be further configured to receive data from and transmit data to (or be otherwise compatible with) one or more user-interface devices 428.

Furthermore, computing system 400 may also include one or more data storage devices 424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 400.

Figure 10:
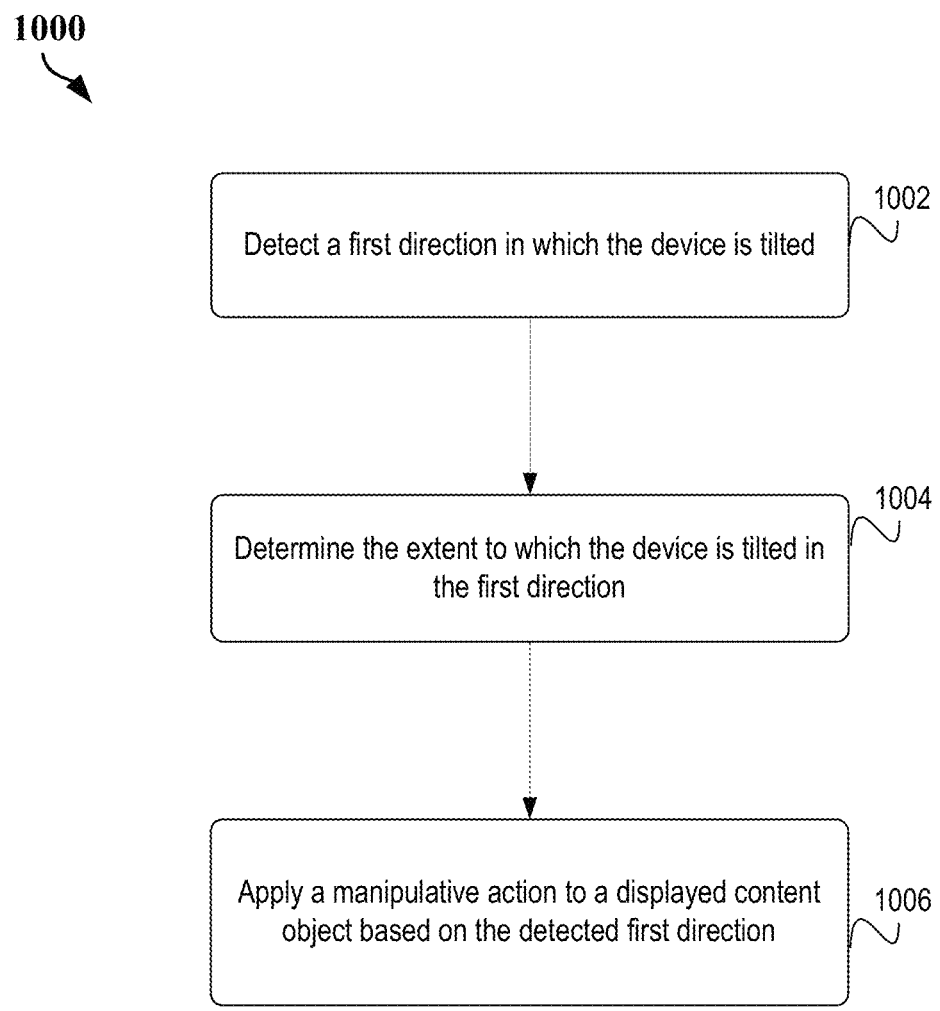
FIG. 10 shows a flowchart depicting an example method for applying a manipulative action to a displayed content object, in accordance with one embodiment.
Figure 11:
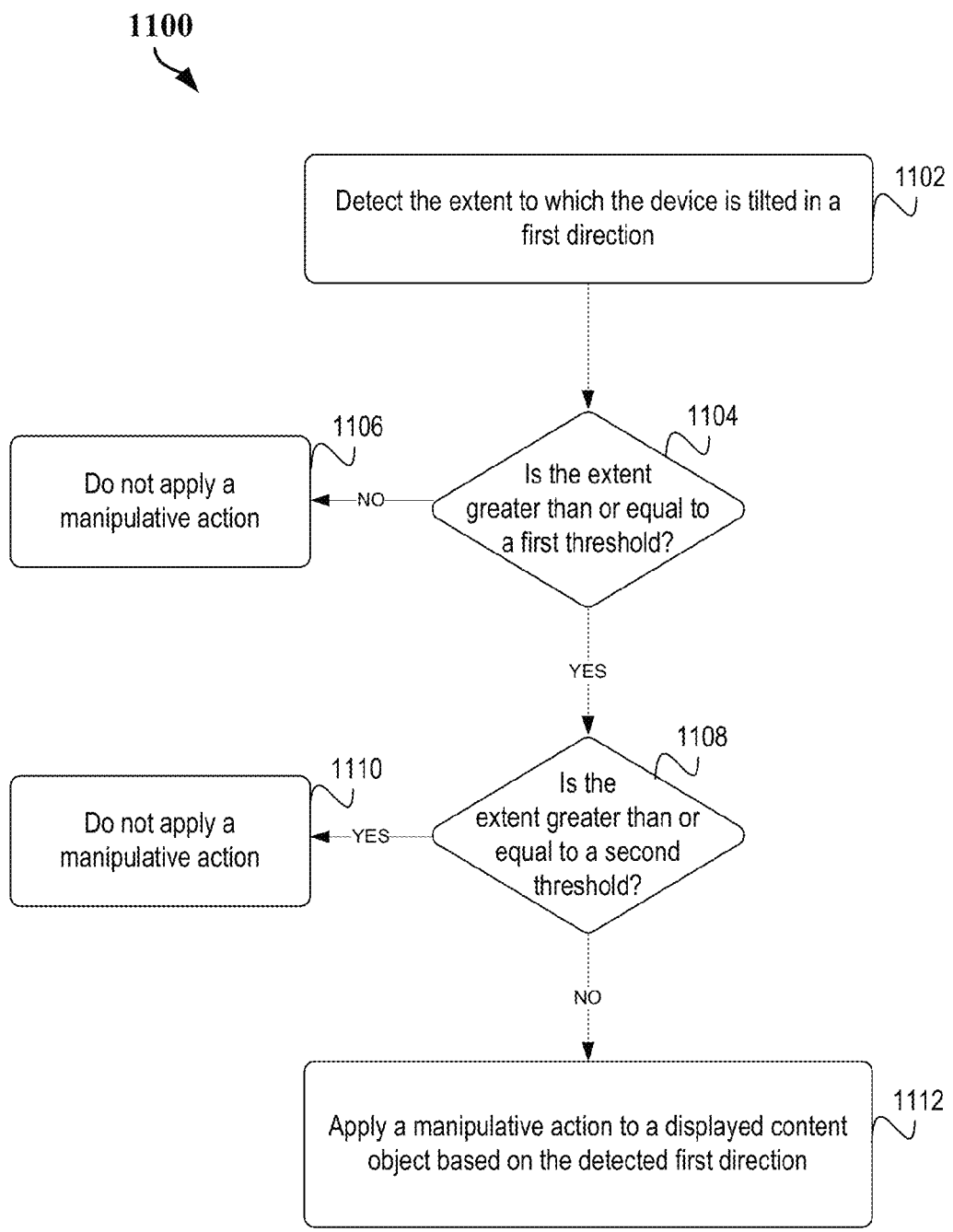
FIG. 11 shows a flowchart depicting an example method for determining whether to apply a manipulative action to a displayed content object, in accordance with one embodiment.

According to an example embodiment, computing system 400 may include program instructions 426 that are stored in a non-transitory, computer readable medium, such as system memory 404 (and/or possibly in another data-storage medium) and executable by processor 402 to facilitate the various functions described herein including, but not limited to, those functions described with respect to FIGS. 10 and 11. Although various components of computing system 400 are shown as distributed components, it should be understood that any of such components may be physically integrated and/or distributed according to the desired configuration of the computing system.

3. EXAMPLE USER-INTERFACE

FIGS. 5A-D show aspects of an example user-interface 500. The user-interface 500 may be displayed by, for example, a wearable computing device as described above for FIGS. 1A-2B.

Figure 5A:
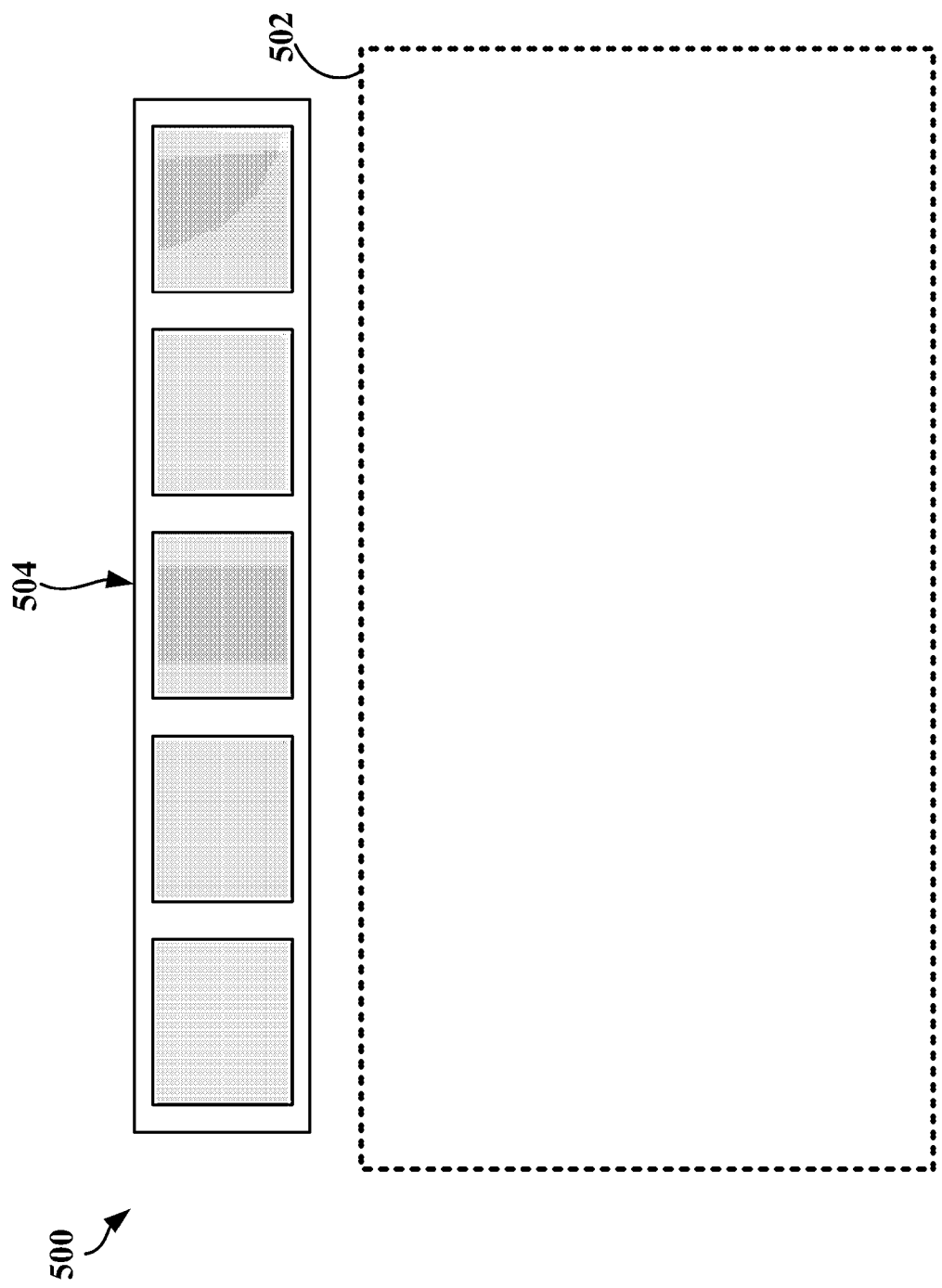
FIG. 5A shows aspects of an example user-interface.

An example state of the user-interface 500 is shown in FIG. 5A. The example state shown in FIG. 5A may correspond to a first position of the wearable computing device. That is, the user-interface 500 may be displayed as shown in FIG. 5A when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 500 includes a view region 502. An example boundary of the view region 502 is shown by a dotted frame. While the view region 502 is shown to have a landscape shape (in which the view region 502 is wider than it is tall), in other embodiments the view region 502 may have a portrait or square shape, or may have a non-rectangular shape, such as a circular or elliptical shape. The view region 502 may have other shapes as well.

The view region 502 may be, for example, the viewable area between (or encompassing) the upper, lower, left, and right boundaries of a display on the wearable computing device. As shown, when the wearable computing device is in the first position, the view region 502 is substantially empty (e.g., completely empty) of user-interface elements, such that the user's view of their real-world environment is generally uncluttered, and objects in the user's environment are not obscured.

In some embodiments, the view region 502 may correspond to a field of view of a wearer of the wearable computing device, and an area outside the view region 502 may correspond to an area outside the field of view of the wearer. In other embodiments, the view region 502 may correspond to a non-peripheral portion of a field of view of a wearer of the wearable computing device, and an area outside the view region 502 may correspond to a peripheral portion of the field of view of the wearer. In still other embodiments, the user-interface 500 may be larger than or substantially the same as a field of view of a wearer of the wearable computing device, and the field of view of the wearer may be larger than or substantially the same size as the view region 502. The view region 502 may take other forms as well.

Accordingly, the portions of the user-interface 500 outside of the view region 502 may be outside of or in a peripheral portion of a field of view of a wearer of the wearable computing device. For example, as shown, a menu 504 may be outside of or in a peripheral portion of the field of view of the user in the user-interface 500. While the menu 504 is shown to be not visible in the view region 502, in some embodiments the menu 504 may be partially visible in the view region 502.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the view region 502 and the menu 504 to move such that the menu 504 becomes more visible in the view region 502. For example, the wearable computing device may cause the view region 502 to move upward and may cause the menu 504 to move downward. The view region 502 and the menu 504 may move the same amount, or may move different amounts. In one embodiment, the menu 504 may move further than the view region 502. As another example, the wearable computing device may cause only the menu 504 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 122 described above in connection with FIG. 1A. In some embodiments, the movement data may comprise a binary indication corresponding to the upward movement. In other embodiments, the movement data may comprise an indication corresponding to the upward movement as well as an extent of the upward movement. The movement data may take other forms as well.

Figure 5B:
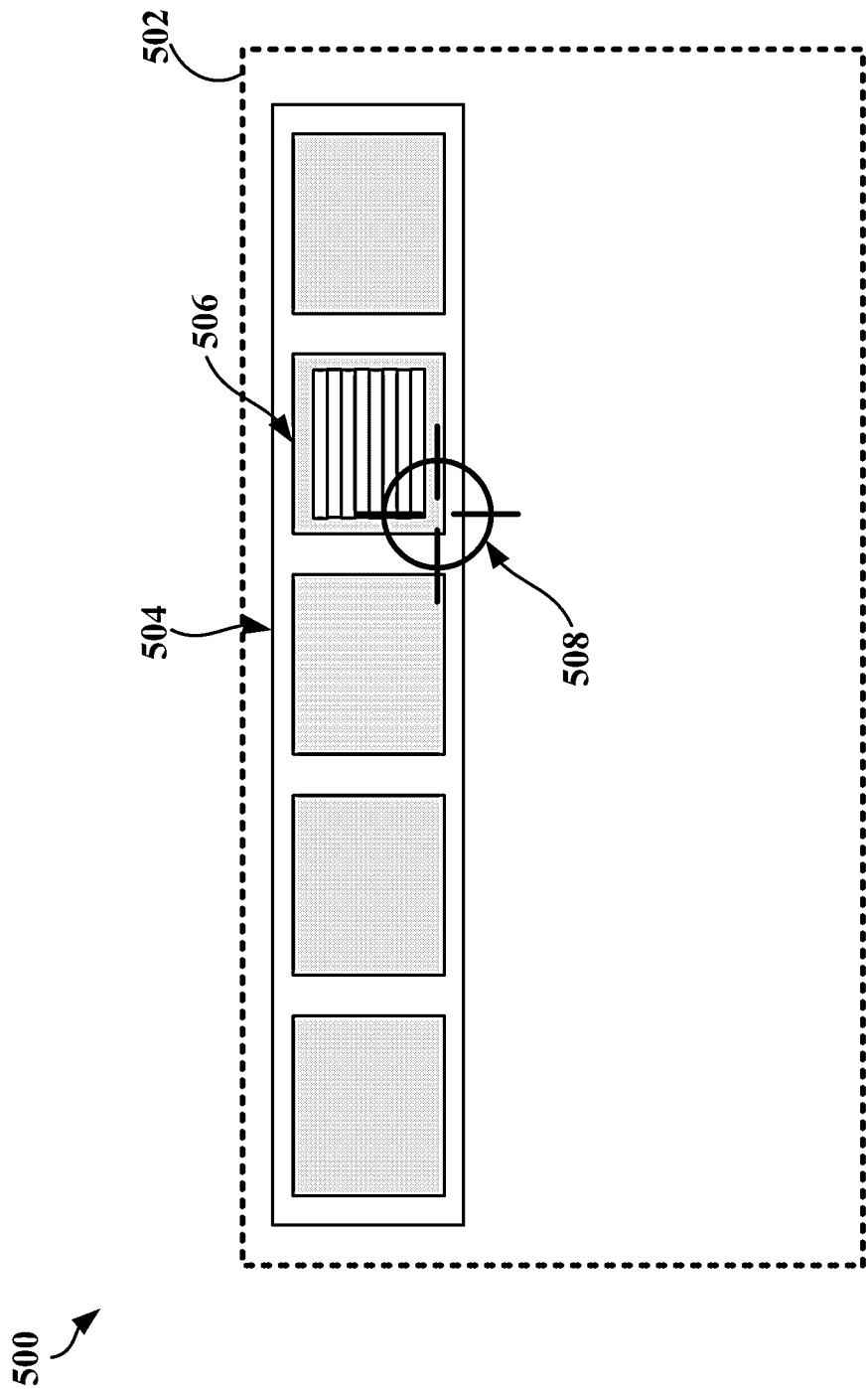
FIG. 5B shows aspects of an example user-interface after receiving movement data corresponding to an upward movement.

FIG. 5B shows aspects of an example user-interface after receiving movement data corresponding to an upward movement. As shown, the user-interface 500 includes the view region 502 and the menu 504.

As noted above, in response to receiving the movement data corresponding to an upward movement of the wearable computing device, the wearable computing device may move one or both of the view region 502 and the menu 504 such that the menu 504 becomes more visible in the view region 502.

As shown, the menu 504 is fully visible in the view region 502. In other embodiments, however, only a portion of the menu 504 may be visible in the view region 502. In some embodiments, the extent to which the menu 504 is visible in the view region 502 may be based at least in part on an extent of the upward movement.

Thus, the view region 502 may be moved in response to receiving data corresponding to an upward movement. In some embodiments, the view region 502 may be moved in an upward scrolling or panning motion. For instance, the view region 502 may appear to a wearer of the wearable computing device as if mapped onto the inside of a static sphere centered at the wearable computing device, and movement of the view region 502 may map onto movement of the real-world environment relative to the wearable computing device. A speed, acceleration, and/or magnitude of the upward scrolling may be based at least in part on a speed, acceleration, and/or magnitude of the upward movement. In other embodiments, the view region 502 may be moved by, for example, jumping between fields of view. In still other embodiments, the view region 502 may be moved only when the upward movement exceeds a threshold speed, acceleration, and/or magnitude. In response to receiving data corresponding to an upward movement that exceeds such a threshold or thresholds, the view region 502 may pan, scroll, slide, or jump to a new field of view. The view region 502 may be moved in other manners as well.

While the foregoing description focused on upward movement, it is to be understood that the wearable computing device could be configured to receive data corresponding to other directional movement (e.g., downward, leftward, rightward, etc.) as well, and that the view region 502 may be moved in response to receiving such data in a manner similar to that described above in connection with upward movement.

As shown, the menu 504 includes a number of content objects 506. In some embodiments, the content objects 506 may be arranged in a ring (or partial ring) around and above the head of a wearer of the wearable computing device. In other embodiments, the content objects 506 may be arranged in a dome-shape above the wearer's head. The ring or dome may be centered above the wearable computing device and/or the wearer's head. In other embodiments, the content objects 506 may be arranged in other ways as well.

The number of content objects 506 in the menu 504 may be fixed or may be variable. In embodiments where the number is variable, the content objects 506 may vary in size according to the number of content objects 506 in the menu 504. In embodiments where the content objects 506 extend circularly around a wearer's head, like a ring (or partial ring), only some of the content objects 506 may be visible at a particular moment. In order to view other content objects 504, a wearer of the wearable computing device may interact with the wearable computing device to, for example, rotate the content objects 506 along a path (e.g., clockwise or counterclockwise) around the wearer's head. To this end, the wearable computing device may be configured to receive data indicating such an interaction through, for example, a touch pad, such as finger-operable touch pad 124. Alternatively or additionally, the wearable computing device may be configured to receive such data through other input devices as well.

Depending on the application of the wearable computing device, the content objects 506 may take several forms. For example, the content objects 506 may include one or more of people, contacts, groups of people and/or contacts, calendar items, lists, notifications, alarms, reminders, status updates, incoming messages, icons, documents, spreadsheets, recorded media, audio recordings, video recordings, photographs, digital collages, previously-saved states, webpages, and applications, as well as tools, such as a still camera, a video camera, and an audio recorder. Content objects 506 may take other forms as well.

In embodiments where the content objects 506 include tools, the tools may be located in a particular region of the menu 504, such as the center. In some embodiments, the tools may remain in the center of the menu 504, even if the other content objects 506 rotate, as described above. Tool content objects may be located in other regions of the menu 504 as well.

The particular content objects 506 that are included in menu 504 may be fixed or variable. For example, the content objects 506 may be preselected by a wearer of the wearable computing device. In another embodiment, the content objects 506 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 506 may fixed, while the content objects 506 may be variable. The content objects 506 may be selected in other manners as well.

Similarly, an order or configuration in which the content objects 506 are displayed may be fixed or variable. In one embodiment, the content objects 506 may be pre-ordered by a wearer of the wearable computing device. In another embodiment, the content objects 506 may be automatically ordered based on, for example, how often each content object 506 is used (on the wearable computing device only or in other contexts as well), how recently each content object 506 was used (on the wearable computing device only or in other contexts as well), an explicit or implicit importance or priority ranking of the content objects 506, and/or other criteria.

In some embodiments, the wearable computing device may be further configured to receive from the wearer a selection of a content object 506 from the menu 504. To this end, the user-interface 500 may include a cursor 508, shown in FIG. 5B as a reticle, which may be used to navigate to and select content objects 506 from the menu 504. In some embodiments, the cursor 508 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, like the sensor 122, or may be included in a peripheral device communicatively coupled to the wearable computing device. As another example, the selection data may be (or may be derived from) data received from a touch pad, such as the finger-operable touch pad 124 described above in connection with FIG. 1A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or peripheral device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner). Alternatively or additionally, the predetermined movements may involve a predetermined movement of a peripheral device communicatively coupled to the wearable computing device. The peripheral device may similarly be wearable by a wearer of the wearable computing device, such that the movement of the peripheral device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown in FIG. 5B, a wearer of the wearable computing device has navigated the cursor 508 to the content object 506 using one or more predetermined movements. In order to select the content object 506, the wearer may perform an additional predetermined movement, such as holding the cursor 508 over the content object 506 for a predetermined period of time. The wearer may select the content object 506 in other manners as well.

Once a content object 506 is selected, the wearable computing device may cause the content object 506 to be displayed in the view region 502 as a selected content object.

Figure 5C:
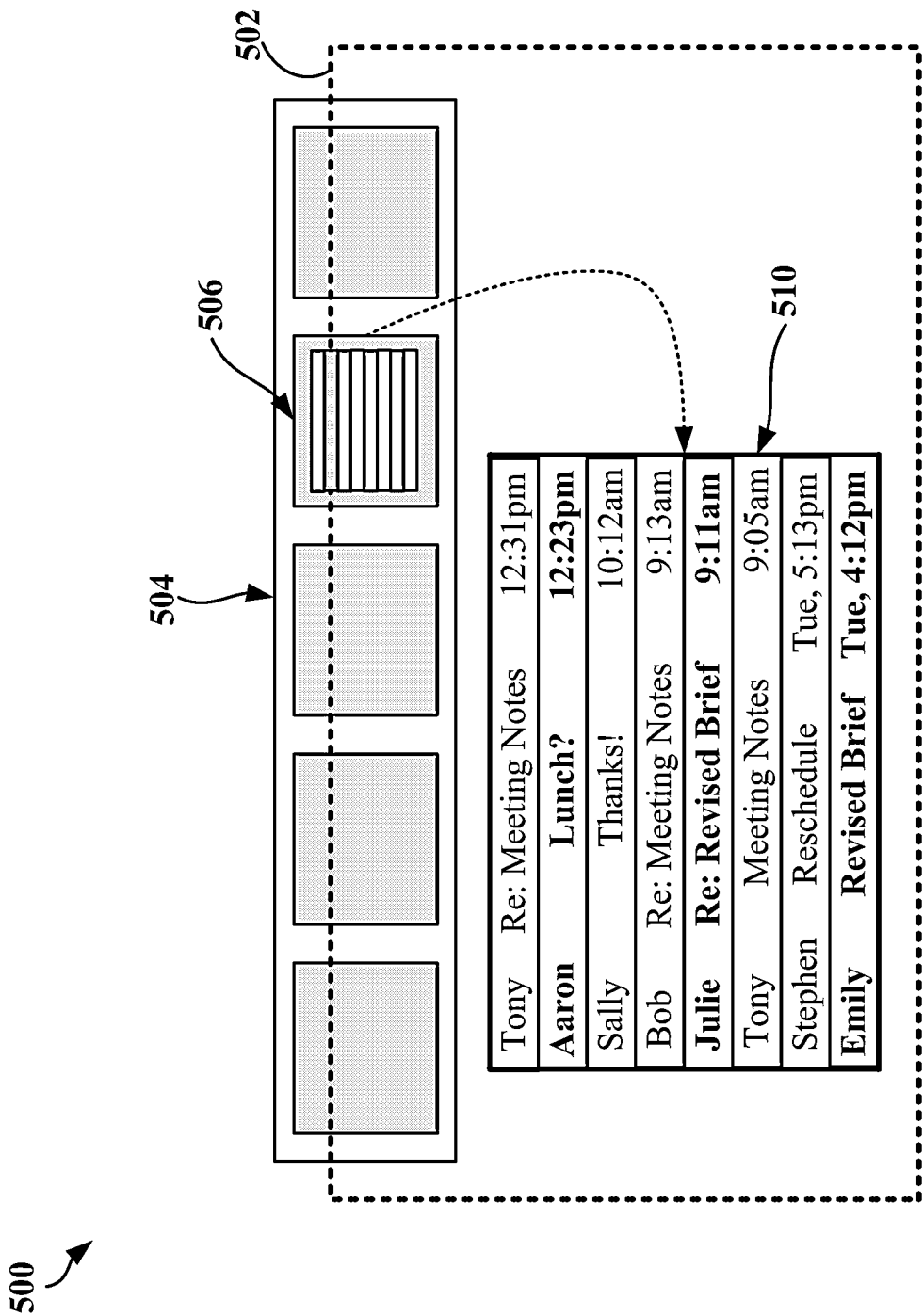
FIG. 5C shows aspects of an example user-interface after selection of a selected content object.

FIG. 5C shows aspects of an example user-interface after selection of a selected content object, in accordance with an embodiment.

As indicated by the dotted arrow, the content object 506 is displayed in the view region 502 as a selected content object 510. As shown, the selected content object 510 is displayed larger and in more detail in the view region 502 than in the menu 504. In other embodiments, however, the selected content object 510 could be displayed in the view region 502 smaller than or the same size as, and in less detail than or the same detail as, the menu 504. In still other embodiments, the selected content object 510 could be a document of some kind (e.g., a text document or a document formatted according to the Portable Document Format (PDF), etc.), whereas the content object 506 could be displayed in menu 504 as an icon or textual link to the document. And in some embodiments, additional content (e.g., actions to be applied to, with, or based on the selected content object 510, information related to the selected content object 510, and/or modifiable options, preferences, or parameters for the selected content object 510, etc.) may be showed adjacent to or nearby the selected content object 510 in the view region 502.

4. EXAMPLE SELECTED CONTENT OBJECT MANIPULATION

Once the selected content object 510 is displayed in the view region 502, a wearer of the wearable computing device may interact with and manipulate the display of the selected content object 510. For example, as the selected content object 510 is shown as an email inbox, the wearer may wish to read one of the emails in the email inbox. Depending on the selected content object, the wearer may interact with the selected content object in other ways as well (e.g., the wearer may locate additional information related to the selected content object 510, modify, augment, and/or delete the selected content object 510, etc.). To this end, the wearable computing device may be further configured to receive input data corresponding to one or more predetermined movements indicating interactions with the user-interface 500. The input data may take any of the forms described above in connection with the selection data.

Figure 5D:
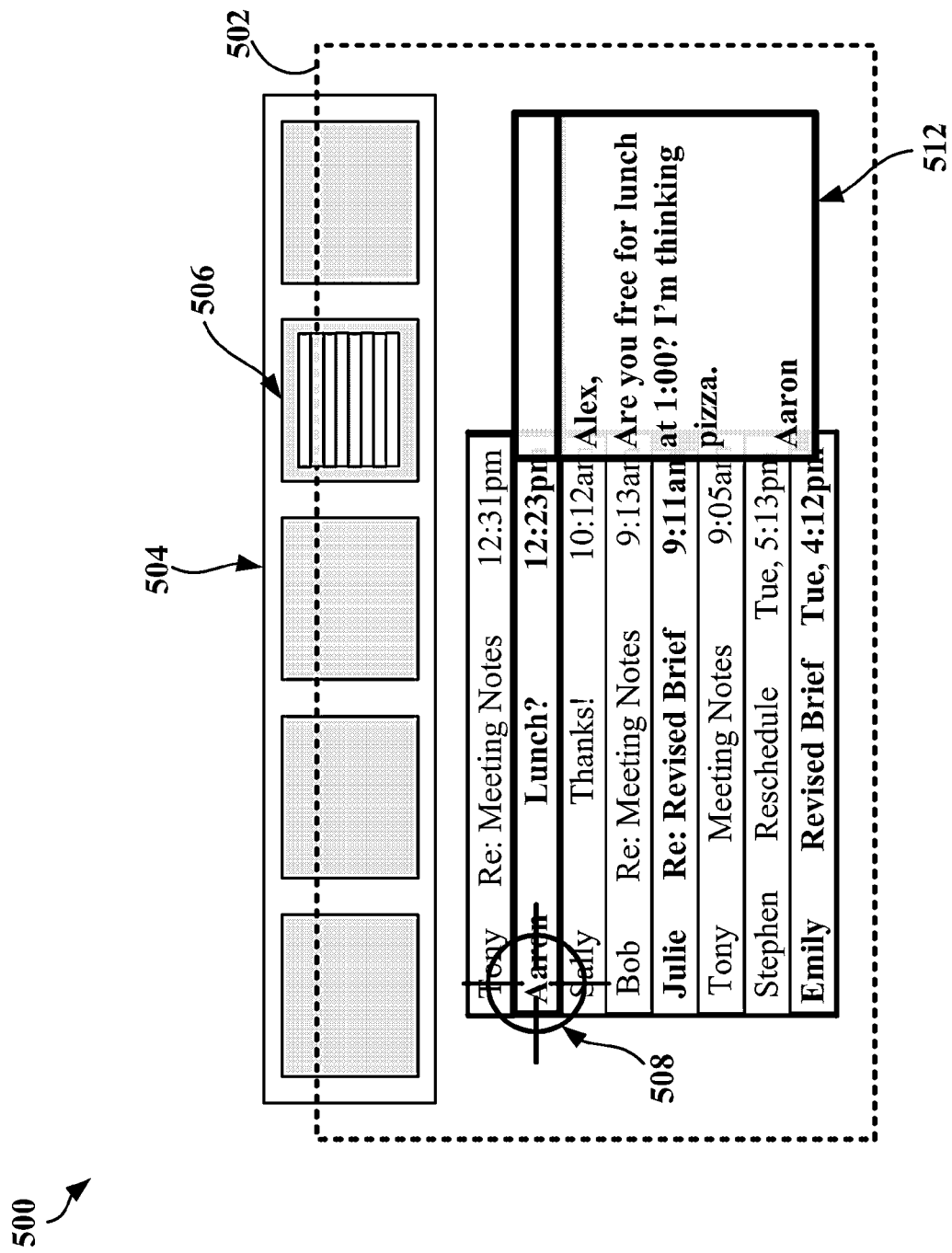
FIG. 5D shows aspects of an example user-interface after receiving input data corresponding to a user input.

FIG. 5D shows aspects of an example user-interface after receiving input data corresponding to a user input, in accordance with an embodiment. As shown, a wearer of the wearable computing device has navigated the cursor 508 to a particular subject line in the email inbox and selected the subject line. As a result, the email 512 is displayed in the view region, so that the wearer may read the email 512. The wearer may interact with the user-interface 500 in other manners as well, depending on, for example, the selected content object.

Figure 6C:
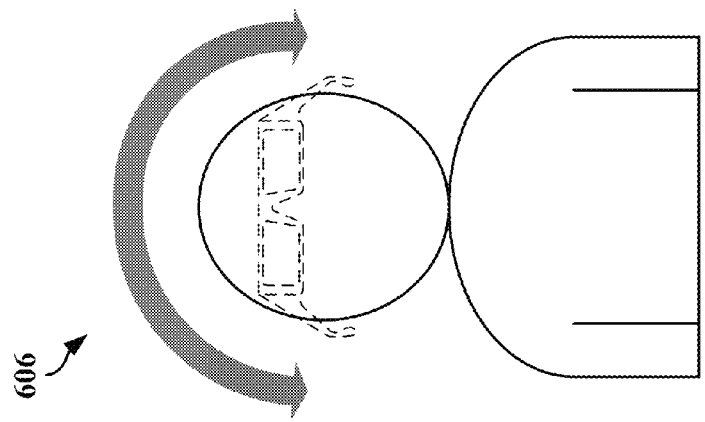
FIGS. 6A-C show three directions in which a wearer of the wearable computing device may tilt the device.
Figure 6B:
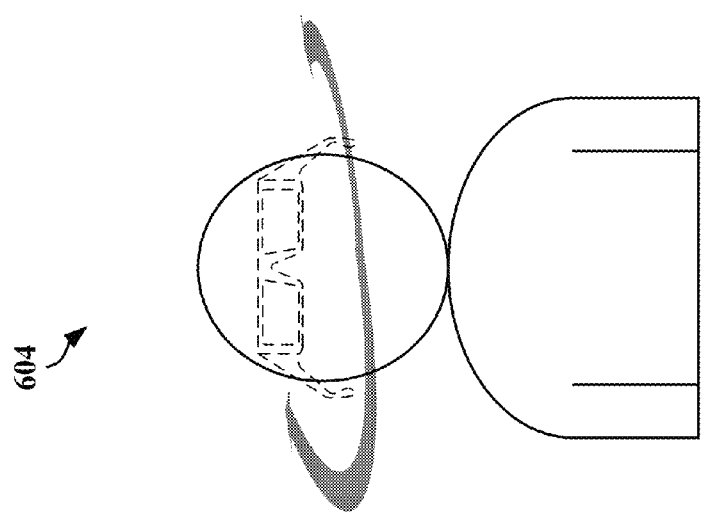
Figure 6A:
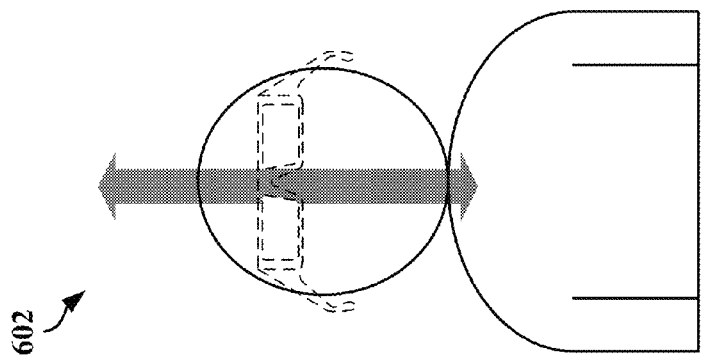

In accordance with another embodiment, a wearer of the wearable computing device may tilt the device to a certain degree and the device may respond by applying a visual manipulation (referred to herein as a manipulative action) to the selected content object. FIGS. 6A-C illustrate examples of tilting a head-mounted device. In particular, FIG. 6A is a view from behind a wearer 602 and depicts a first direction in which the wearer 602 may tilt the head-mounted device. As depicted, the wearer 602 may tilt the device in the first direction by, for example, looking straight up or straight down. FIG. 6B is a view behind a wearer 604 and depicts a second direction in which the wearer 604 may tilt the head-mounted device. As depicted, the wearer 604 may tilt the device in the second direction by, for example, looking directly left or looking directly right. Finally, FIG. 6C is a view behind a wearer 606 and depicts a third direction in which the wearer 606 may tilt the head-mounted device. As depicted, the wearer 606 may tilt the device in the third direction by, for example, bringing the wearer's head directly toward one of the wearer's shoulders.

As described, FIGS. 6A-C depict three example directions in which a wearer may tilt a head-mounted device. Each direction is depicted as being substantially perpendicular to the other two directions. However, in other embodiments, any two directions may not be substantially perpendicular. In addition, even though each of FIGS. 6A-C depict a single direction in which a wearer may tilt a head-mounted device, those skilled in the art will understand that it a wearer may tilt a device in more than one direction at the same time. For example, a wearer may tilt a device in two directions if the wearer looks up and to the left. Other ways of tilting wearable computing devices in one or more directions are possible as well.

The manipulative actions applied to the selected content object in response to tilting may take several forms depending on, for example, the type of tilt and/or the type of selected content object. In at least one embodiment, the manipulative action may be enlarging or reducing (i.e., shrinking) the display size of the selected content object.

In at least one embodiment, the manipulative action may be zooming in or zooming out on the selected content object without altering the selected content object's display dimensions. Zooming may be used, for example, when the selected content object is a map or a picture. For example, zooming in on a map may zoom in on a particular portion of that map. In this example, zooming may alter the display of the map by, for instance, bringing aspects of the content object into display, such as roads and names of towns, that may not have been displayed before the zooming took place. Other examples of zooming are possible as well and zooming may be used with other selected content objects.

In at least one embodiment, the manipulative action may be panning up, down, left, or right on the selected content object. Panning may be used, for example, when the display size of the selected content object is somewhat smaller than the full dimensions of the selected content object. For example, in embodiments in which the selected content object is a map, panning may move the center of the map such that a different portion of the map is displayed. Panning may be used with other types of selected content objects as well, such as pictures, PDF documents, webpages, etc.

In at least one embodiment, the manipulative action may be rotating the selected content object clockwise or counterclockwise. Rotating may be used, for example, when the selected content is an image or document. For instance, sometimes images are taken in a landscape orientation but initially displayed as content objects in the portrait orientation. Aspects of the image may thus appear to be sideways. Rotating a content object that is displayed it the portrait orientation may desirably cause the content object to be displayed in the landscape orientation. Similarly, rotating a content object that is displayed it the landscape orientation may desirably cause the content object to be displayed in the portrait orientation. Other examples of rotating are possible as well, such as rotating the content object to intermediate positions between landscape and portrait orientations.

In at least one embodiment, the manipulative action may be scrolling the selected content object. Scrolling may be used, for example, when the selected content object is a text document, spreadsheet, list of items (e.g., a list of emails in an email inbox), etc. For example, scrolling up on a text document may move the displayed lines of text down, which moves some lines off the display at the bottom of the document and brings some new lines into display at the top of the document. Similarly, scrolling a list of items (e.g., a list of emails in an email inbox) may bring some new items into display from one direction while moving some items off the display in the other direction. Other examples of scrolling are possible as well.

In at least one embodiment, the manipulative action may be moving the selected content object. Moving the selected content object may be used, for example, when the wearer desires that the selected content object be displayed in a different location on the user interface. Example directions that a selected content object could move are up, down, to the left, and to the right. In addition, moving may be applied in two (or more) directions at the same time, for example.

In at least one embodiment, the manipulative action may be cycling the display to a new content object. Cycling may be used, for example, when the selected content object is associated with a group of other content objects. For example, in embodiments in which the selected content object is one image in a photo album, cycling may change the displayed image to another image from that photo album. In embodiments in which the selected content object is a web page, cycling may change the displayed webpage to a previously viewed webpage. Alternatively, cycling may change the selected content object to another content object from the menu 504. Other examples of cycling are possible as well.

In at least one embodiment, the manipulative action may be selecting. Selecting may be used for example when the cursor 508 is hovering over an item or other content object. Engaging in selecting action while the cursor is hovering over an item may cause that item to be displayed in a new window. For instance, in embodiments in which the selected content is a list of emails in an email inbox, selecting one of the emails may cause that email to be opened in a new window. Other examples of selecting are possible as well. Other examples of manipulative actions are also possible.

The wearable computing device may apply any one of the above-described manipulative actions (and possibly other manipulative actions not described herein) to the selected content object in response to detecting that the wearable computing device is tilted in at least one direction. In some embodiments, each possible direction of tilting is assigned at least one manipulative action.

For example, in one embodiment, scrolling up and down may be assigned to the direction indicated by the arrows in FIG. 6A, panning left and right may be assigned to the direction indicated by the arrows in FIG. 6B, and cycling may be assigned to the direction indicated by the arrows in FIG. 6C. In this embodiment, when the wearer looks straight up, the wearable computing device scrolls up on the selected content object, whereas when the wearer looks straight down, the device scrolls down on the selected content object. Likewise, when the wearer looks straight left, the device pans left on the selected content object, whereas when the wearer looks straight right, the device pans right. And when the wearer brings the wearer's head toward the wearer's left shoulder, the device cycles the selected content object backward, whereas when the wearer brings the wearer's head toward the wearer's right shoulder, the device cycles the selected content object forward. In other embodiments, different manipulative actions are assigned to the directions indicated by the arrows in FIGS. 6A-C. Generally, any manipulative action may be assigned to any direction of movement of the wearable computing device.

In at least one embodiment, the same manipulative action may be assigned to at least two different directions indicated by the arrows in FIGS. 6A-C. For example, in one embodiment, panning may be assigned to the directions indicated by the arrows in FIGS. 6A-B. Thus, in this embodiment, looking up may cause the device to pan up on the selected content object, looking down may cause the device to pan down on the selected content object, looking left may cause the device to pan left on the selected content object, and looking right may cause the device to pan right on the selected content object. Other combinations of assigning particular manipulative actions to multiple directions are possible as well.

In some embodiments, the device may apply two manipulative actions in response to detecting that the device is tilted in two different directions. For example, in some embodiments, when a wearer looks up and to the right, the device may apply the manipulative action assigned to the direction indicated by the arrows in FIG. 6A and the manipulative action assigned to the direction indicated by the arrows in FIG. 6B. In some embodiments, the device may apply the two manipulative actions at the same time, whereas in other embodiments, the device applies one manipulative action first, and upon completion of that manipulative action, applies the other manipulative action.

For example, in an embodiment in which scrolling is assigned to the direction indicated by the arrows in FIG. 6A and zooming is assigned to the direction indicated by the arrows in FIG. 6B, a wearer may cause simultaneous scrolling and zooming by looking up and to the right. Other examples of applying two manipulative actions are possible as well. Moreover, in some embodiments, a device may apply three (or more) manipulative actions in response to detecting that the device is tilted in three (or more) directions.

In some embodiments, manipulative actions may be assigned to certain directions and are applied to the selected content object without regard to the selected content object's type or format. In one embodiment, for example, zooming may be assigned to the direction indicated by the arrows in FIG. 6A. Thus, when the user looks up, the device may zoom in on the selected content object, regardless of whether the selected content object is a picture, a list, a document, etc.

However, in other embodiments, the manipulative action assigned to a certain direction may change depending on the type of selected content object. For example, in one embodiment, panning may be assigned to the direction indicated by the arrows in FIG. 6A when the selected content object is a picture or map. And scrolling may be assigned to the same direction when the selected content object is a text document or a list. Other combinations are possible as well. Furthermore, the wearable computing device may include functionality that enables a wearer to customize the assignment of manipulative actions to directions and selected content object types to suit the wearer's preferences. Accordingly, any combination of manipulative action, direction, and selected content object type are possible.

In some embodiments, the wearable computing device may apply manipulative actions to different degrees depending on the extent to which the device is tilted. For example, the device may apply a manipulative action at one speed in response to detecting that the device is tilted at a relatively small angle, but apply the manipulative action at a faster speed in response to detecting that the device is tilted at a relatively large angle.

Figure 7:
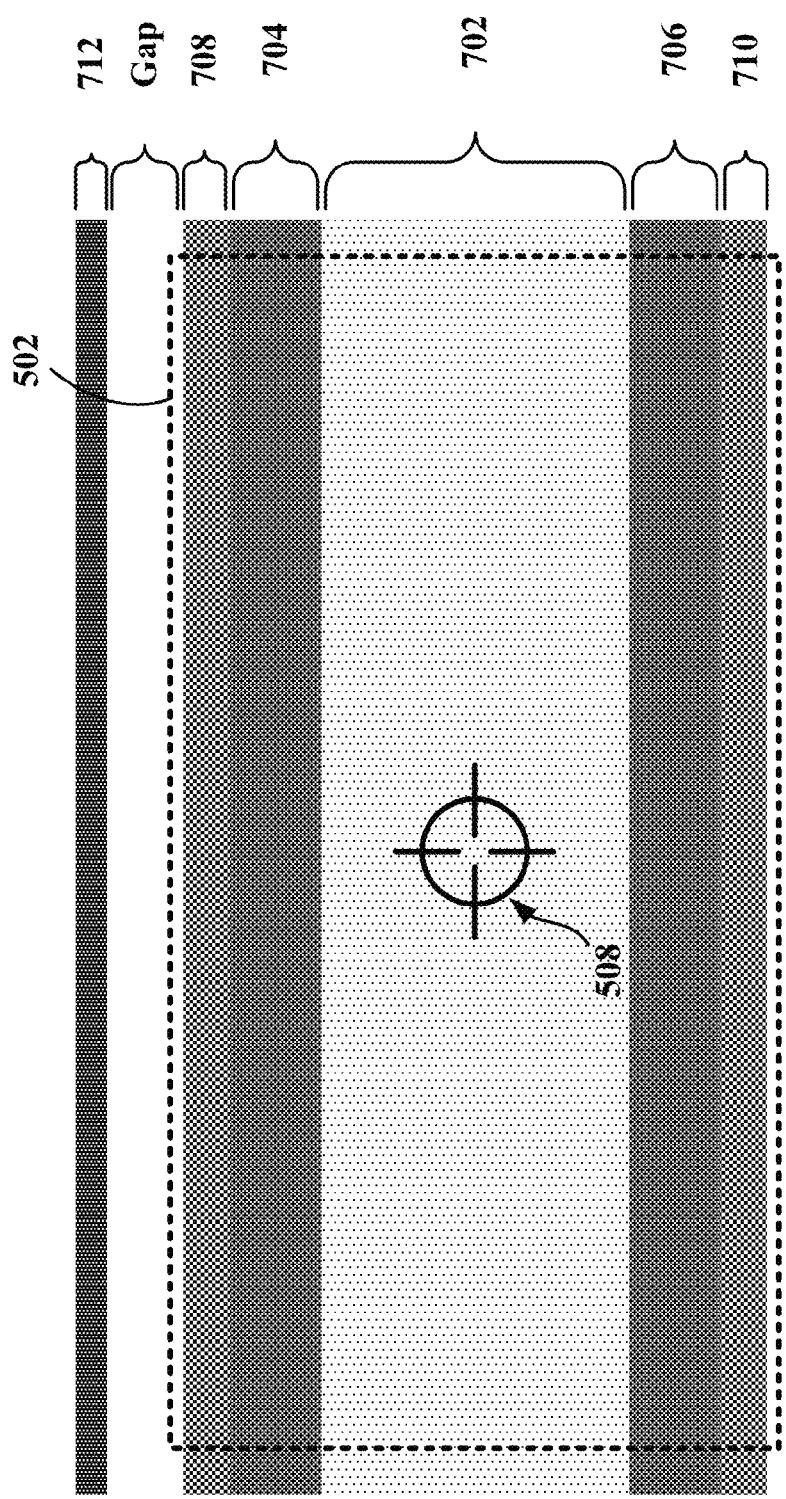
FIG. 7 shows several extents to which a wearer of the wearable computing device may tilt the device in one example direction.

FIG. 7 depicts example extents to which the wearable computing device may be tilted in the direction indicated by the arrows in FIG. 6A. In FIG. 7, such extents are depicted as six zones: 702, 704, 706, 708, 710, and 712. For the purpose of description, the zones and may be thought of as frames of reference that do not move when a wearer tilts the device. FIG. 7 also depicts a cursor 508, which, for illustration purposes, may be thought of as generally tracking the position of the wearer's head. Thus, when a wearer is looking straight ahead and not substantially tilting the device, the cursor 508 appears somewhere in zone 702, typically towards the center of the zone. The position of the device when the cursor 508 is towards the center of zone 702 is sometimes referred to as a non-tilted state or a first state, whereas the position of the device when the cursor 508 is outside the center of zone 702 is sometimes referred to as a tilted state or a second state.

A slight tilt in the direction indicated by the arrows in FIG. 6A will generally move the cursor 508 slightly but keep it in zone 702. In the embodiment depicted in FIG. 7, the device may not apply the manipulative action assigned to this direction until a wearer tilts the device sufficiently for the cursor 508 to move out of zone 702. For example, when a wearer tilts the device sufficiently for the cursor 508 to move into zone 704 (e.g., by looking straight up), the device may apply the manipulative action to a first degree, whereas when the wearer tilts the device sufficiently for the cursor 508 to move into zone 708, the device may apply the manipulative action to a second, greater, degree. Likewise, when the wearer tilts the device sufficiently in the opposite direction into zone 706 (e.g., by looking straight down), the device may apply the manipulative action assigned to that direction to a first degree, whereas when the wearer tilts the device sufficiently for the cursor 508 to move into zone 710, the device may apply the manipulative action to a second, greater degree.

In the embodiment depicted in FIG. 7, there is a gap between zones 708 and 712. In this embodiment, when the wearer tilts the device such that the cursor 508 moves out of zone 708 and into the gap, the device does not apply the manipulative action assigned to this direction. Instead, the device may carry out some other action, such as displaying the menu 504, or any other suitable action.

By way of example, the border separating zones 702 and 704 may correspond to a tilt of 15 degrees, the border separating zones 704 and 708 may correspond to a tilt of 22 degrees, and the border separating the gap and zone 712 may correspond to a tilt of 33 degrees. Likewise, the border separating zones 702 and 706 may correspond to a tilt of −15 degrees, and the border separating zones 706 and 710 may correspond to a tilt of −22 degrees. However, as those skilled in the art will appreciate, the depiction of FIG. 7 is merely one example configuration of zones, and other configurations of zones are possible, including, for example, more or fewer zones, more or fewer gaps, and zone borders corresponding to different angles of tilt.

Figure 8:
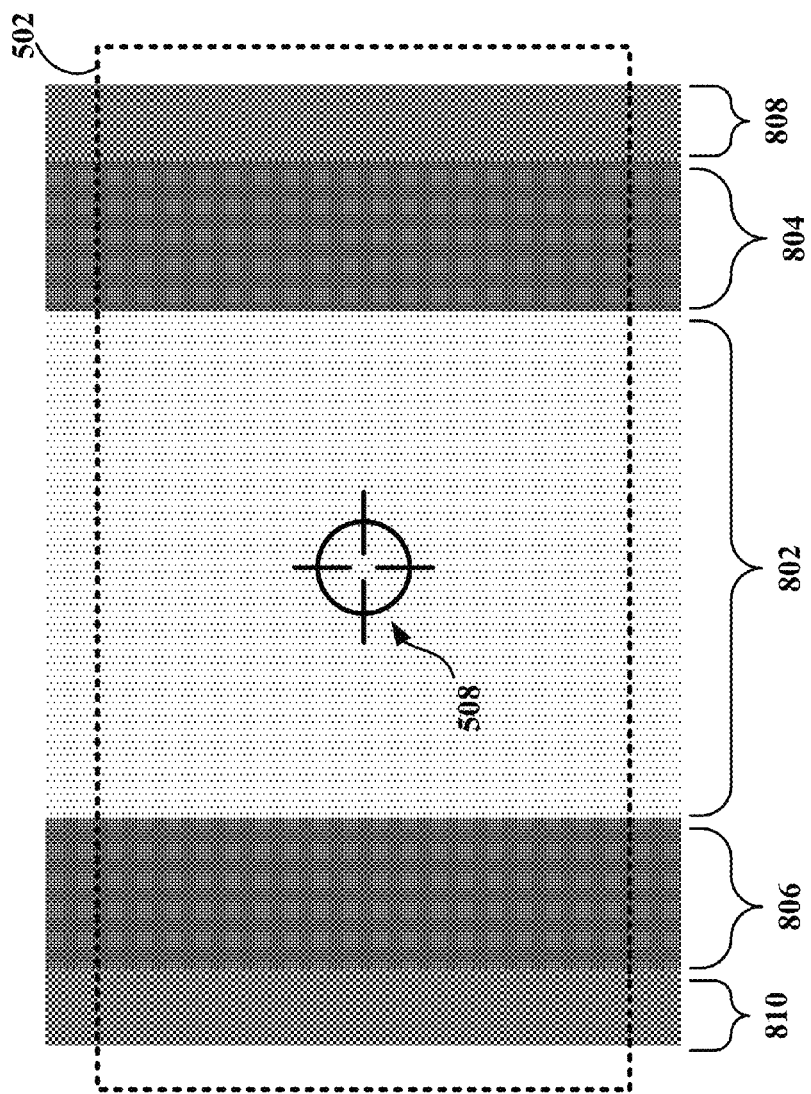
FIG. 8 shows several extents to which a wearer of the wearable computing device may tilt the device in another example direction.

FIG. 8 depicts example extents to which the wearable computing device may be tilted in the direction indicated by the arrows in FIG. 6B. In FIG. 8, such extents are depicted as five zones: 802, 804, 806, 808, and 810. Much like the example embodiment depicted in FIG. 7, the zones here may be thought of as frames of reference that do not move when a wearer tilts the device. Thus, when a wearer is looking straight ahead and not substantially tilting the device, the cursor 508 appears somewhere in zone 802, typically towards the center of the zone. The position of the device when the cursor 508 is towards the center of zone 802 is also sometimes referred to as a non-tilted state or a first state, whereas the position of the device when the cursor 508 is outside the center of zone 802 is sometimes referred to as a tilted state or a second state.

A slight tilt in the direction indicated by the arrows in FIG. 6B will generally move the cursor 508 slightly but keep it in zone 802. In the embodiment depicted in FIG. 8, the device does not apply the manipulative action assigned to this direction until a wearer tilts the device sufficiently for the cursor 508 to move out of zone 802. For example, when a wearer tilts the device sufficiently for the cursor 508 to move into zone 804, the device may apply the manipulative action to a first degree, whereas when the wearer tilts the device sufficiently for the cursor 508 to move into zone 808, the device may apply the manipulative action to a second, greater degree. Likewise, when the wearer tilts the device sufficiently in the opposite direction into zone 806, the device may apply the manipulative action assigned to that direction to a first degree, whereas when the wearer tilts the device sufficiently for the cursor 508 to move into zone 810, the device may apply the manipulative action to a second, greater degree.

By way of example, the border separating zones 802 and 804 may correspond to a tilt of 15 degrees, and the border separating zones 804 and 808 may correspond to a tilt of 22 degrees. Likewise, the border separating zones 802 and 806 may correspond to a tilt of −15 degrees, and the border separating zones 806 and 810 may correspond to a tilt of −22 degrees. However, as those skilled in the art will appreciate, the depiction of FIG. 8 is merely one example configuration of zones, and other configurations of zones are possible, including for example, more or fewer zones, more or fewer gaps, and zone borders corresponding to different angles of tilt.

Figure 9:
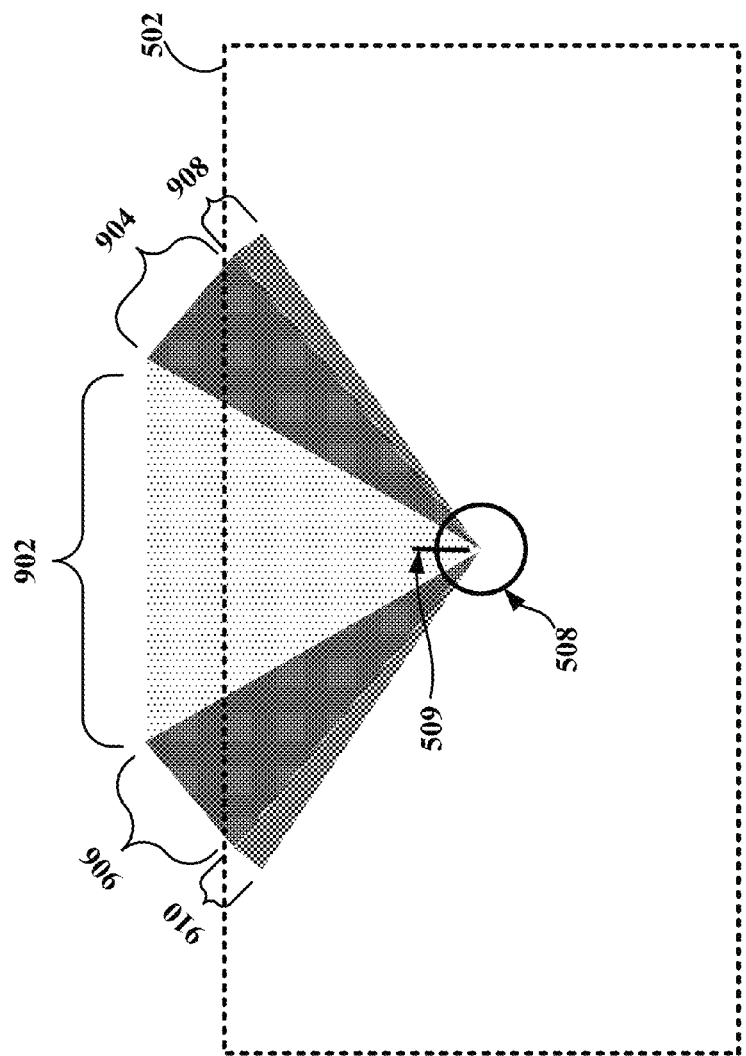
FIG. 9 shows several extents to which a wearer of the wearable computing device may tilt the device in yet another example direction.

FIG. 9 depicts example extents to which the wearable computing device may be tilted in the direction indicated by the arrows in FIG. 6C. In FIG. 9, such extents are depicted as five zones: 902, 904, 906, 908, and 910. Much like the example embodiments depicted in FIGS. 7-8, the zones here may be thought of as frames of reference that do not move when a wearer tilts the device. For additional reference, cursor 508 is shown as including a cross hair 509 as a means to assist in determining the extent of tilt in this direction. Thus, when a wearer is looking straight ahead and not substantially tilting the device, the crosshair 509 is in zone 802, typically in a substantially vertical position (i.e., the center of zone 902). The position of the device when the crosshair 509 is towards the center of zone 902 is also sometimes referred to as a non-tilted state or a first state, whereas the position of the device when the crosshair 509 is outside the center of zone 902 is sometimes referred to as a tilted state or a second state.

A slight tilt in the direction indicated by the arrows in FIG. 6C will generally rotate the crosshair 509 slightly but keep it in zone 902. In the embodiment depicted in FIG. 9, the device does not apply the manipulative action assigned to this direction until a wearer tilts the device sufficiently for the crosshair 509 to move out of zone 902. For example, when a wearer tilts the device sufficiently for the crosshair 509 to move into zone 904, the device may apply the manipulative action to a first degree, whereas when the wearer tilts the device sufficiently for the crosshair 509 to move into zone 908, the device may apply the manipulative action to a second, greater degree. Likewise, when the wearer tilts the device sufficiently in the opposite direction and the crosshair 509 moves into zone 906, the device may apply the manipulative action assigned to that direction to a first degree, whereas when the wearer tilts the device sufficiently for the crosshair 509 to move into zone 910, the device may apply the manipulative action to a second, greater degree.

By way of example, the border separating zones 902 and 904 may correspond to a tilt of 15 degrees, and the border separating zones 904 and 908 may correspond to a tilt of 22 degrees. Likewise, the border separating zones 902 and 906 may correspond to a tilt of −15 degrees, and the border separating zones 906 and 910 may correspond to a tilt of −22 degrees. However, as those skilled in the art will appreciate, the depiction of FIG. 9 is merely one example configuration of zones, and other configurations of zones are possible, including for example, more or fewer zones, more or fewer gaps, and zone borders corresponding to different angles of tilt.

The degree to which the device applies a manipulative action may have different meanings for different manipulative actions. In embodiments, in which the manipulative action is enlarging, shrinking, zooming, or rotating, the degree may correspond to the speed in which the selected content object is manipulated. Thus, in one example applying zooming to a greater degree results in zooming faster, whereas applying zooming to a lesser degree results in zooming slower.

In embodiments in which the manipulative action is scrolling, the degree may correspond to how fast or how many lines or items are displaced. Thus, in one example, applying scrolling to a greater degree results in more items (e.g., email messages) per unit time coming into view from one direction and more items per unit time leaving the view from the other direction, whereas applying scrolling to a lesser degree results in fewer items per unit time coming into view from one direction and fewer items per unit time leaving the view from the other direction.

In embodiments in which the manipulative action is cycling, the degree may correspond to how fast or how many items are cycled. Thus, in one example, applying cycling to a lesser degree results in cycling just one item at a time, whereas applying cycling to a greater degree results in cycling two (or more) items at a time. In one specific embodiment in which the selected content object is, say, the third image in an album of 20 images, cycling to a greater degree could take the form of displaying the fifth image (and skipping the display of the fourth image). Other example of cycling are possible as well, as are other examples of applying manipulative actions to greater or lesser degrees.

5. EXAMPLE METHODS

FIG. 10 is a flow diagram 1000 that depicts an example method for applying a manipulative action to a displayed content object in response to detecting device tilt. The example method may include one or more operations, functions, or actions as illustrated by one or more of blocks 1002, 1004, and/or 1006, each of which may be carried out by at least a portion of a wearable computing device, such as any of the wearable computing devices described above.

Furthermore, those skilled in the art will understand that the flow diagrams described herein illustrate functionality and operation of certain implementations of example embodiments. In this regard, each block of each flow diagram may represent a module, a segment, or a portion of program code, which includes one or more instructions executable by a processor (e.g., processor 314 described above with respect to system 300) for implementing specific logical functions or steps in the process. The program code may be stored on any type of computer readable medium (e.g., computer readable storage medium or non-transitory media, such as memory 318 described above with respect to system 300 or system memory 404 described above with respect to system 400), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

As shown, the flow diagram 1000 begins at block 1002 where the wearable computing device detects a first direction in which the device is tilted. The wearable computing device may take any of the forms described above in connection with FIGS. 1A-4. In some embodiments, the wearable computing device may be an HMD. Other wearable computing devices are possible as well.

In some embodiments, the wearable computing device detects the direction in which the device is tilted based at least in part on data received from one or more sensors, such as sensor 122, as described above in connection with FIG. 1A. As mentioned above, such sensors, including sensor 122, may take the form of movement sensors, accelerometers, and/or gyroscopes configured to detect a direction in which the device is tilted as well as the extent to which the device is tilted.

The flow diagram continues at block 1004 where the wearable computing device determines the extent to which the device is tilted in the first direction. The device could determine this tilt extent in any number of ways. In one embodiment, for example, one or more of the sensors described above include data that indicates the extent to which the device is tilted. In another embodiment, the device determines the magnitude of an electrical signal received from one or more of the sensors described above to determine the extent of tilting. Other ways to determine the extent of tilting are possible as well.

The flow diagram continues at block 1006 where the wearable computing device applies a manipulative action to a displayed content object based on the first direction. As described above, example manipulative actions include (but are not limited to) zooming, scrolling, panning, enlarging, shrinking, rotating, selecting, and cycling. As also described above, in some embodiments, the manipulative action is applied to the selected content object to a degree that corresponds to the determined extent to which the device is tilted.

Other example methods for applying one or more manipulative actions to a selected content object are possible as well. In one specific embodiment, another example method includes the functionality depicted by blocks 1002, 1004, and 1006 as well as additional functionality to detect a second direction in which the device is tilted, determine the extent to which the device is tilted in the second direction, and apply a second manipulative action to the displayed content object based on the detected second direction. In some embodiments, the device applies the second manipulative action at substantially the same time as the device applies the first manipulative action. In other embodiments, the device applies the second manipulative action subsequent to applying the first manipulative action.

FIG. 11 is another flow diagram 1100 that depicts another example method for determining whether to apply a manipulative action to a displayed content object. As shown, the flow diagram 1100 begins at block 1102 where the wearable computing device detects an extent to which the device is tilted. In some embodiments, the device detects this extent in a manner similar to that described above in connection with flow diagram 1000 and blocks 1002 and 1004.

The flow diagram continues at block 1104 where the device determines whether the detected extent is greater than or equal to a first threshold extent. When the detected extent is not greater than or equal to the first threshold extent, the flow diagram continues at block 1106 where a manipulative action is not applied to the displayed content object in response to detecting that the device was tilted in the first direction.

However, at block 1104, when the detected extent is greater than or equal to the first threshold extent, flow continues at block 1108 where the device determines whether the detected extent is greater than or equal to a second threshold extent. When the detected extent is greater than or equal to the second threshold extent, the flow diagram continues at block 1110 where a manipulative action is not applied to the displayed content object in response to detecting that the device was tilted in the first direction.

However, at block 1108, when the detected extent is not greater than or equal to the second threshold extent, flow continues at block 1112 where the device applies a manipulative action to the displayed content object based on the first direction. As described above, the device may apply the manipulative action in a manner similar to that described above in connection with flow diagram 1000 and block 1006.

The method depicted by flow diagram 1100 may be used to take advantage of gaps in zones, such as the gap between zones 708 and 712 in FIG. 7. Specifically, the method depicted by flow diagram 1100 applies a manipulative action once the device is tilted in a first direction beyond a first threshold but not tilted so far as to exceed a second threshold. However, once the device's tilt in the first direction exceeds a second threshold, then no manipulative action is applied in connection with the first direction.

In some embodiments, the device may apply an unwanted manipulative action in response to being tilted past the second threshold and into the gap zone. For example, referring back to FIG. 7, when the device is tilted such that cursor 508 moves into the gap zone, the cursor 508 likely passed through zones 704 and 708. Thus, a manipulative action was likely applied to a selected content object while the wearer was in the process of tilting the device to the gap zone. Therefore, in at least one embodiment, when the device is tilted sufficiently for the cursor to move into the gap zone, the device may undo or reverse any manipulative action that was applied to a selected content object while the device was in the process of being tilted to the gap zone. Undoing or reversing any applied manipulative action may include, for example, resetting the selected content object to the same state it was in when the device was in a non-tilted state or a first state. Other examples of undoing or reversing manipulative actions are possible as well.

6. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A head-mounted-device (HMD) system comprising:
at least one processor; and
data storage comprising logic executable by the at least one processor to:
receive data that indicates a first axis along which the HMD is tilted;
receive data that indicates a second axis along which the HMD is tilted, wherein the data further indicates that the HMD is tilted along the second axis at the same time as the HMD is tilted along the first axis;
receive data that indicates an extent to which the HMD is tilted along the first axis;
receive data that indicates an extent to which the HMD is tilted along the second axis;
based on the indicated first axis, apply at least one first manipulative action to a displayed content object during the entire time that the HMD is tilted to at least a threshold extent along the first axis, wherein the at least one manipulative action is applied to a degree corresponding to the indicated extent to which the HMD is tilted along the first axis; and
based on the indicated second axis, apply at least one second manipulative action to the displayed content object during the entire time that the HMD is tilted to at least a threshold extent along the second axis, wherein the at least one second manipulative action is applied to a degree corresponding to the indicated extent to which the HMD is tilted along the second axis and applied concurrently with the application of the first manipulative action.

2. The system of claim 1, wherein the measured extent to which the HMD is tilted along the first axis comprises an angle between (i) a direction in which the HMD is facing during a first state, and (ii) a direction in which the HMD is facing during a second state.

3. The system of claim 1,
wherein the degree to which the at least one first manipulative action is applied is a speed in which the at least one first manipulative action is applied, and
wherein the degree to which the at least one second manipulative action is applied is a speed in which the at least one second manipulative action is applied.

4. The system of claim 1, wherein the displayed content object is displayed within a graphical user interface displayed on a display of the HMD.

5. The system of claim 1, wherein the first axis and the second axis are two axes of three possible axes along which the HMD is able to be tilted, wherein each axis is substantially perpendicular to the other two axes.

6. The system of claim 1, wherein each of the at least one first manipulative action and the at least one second manipulative action comprises at least one of:
(a) zooming the displayed content object;
(b) scrolling the displayed content object;
(c) panning on the displayed content object;
(d) enlarging the displayed content object
(e) shrinking the displayed content object;
(f) rotating the displayed content object;
(g) moving the displayed content object;
(h) switching from the displayed content object to a new content object to display; and
(i) cycling between displaying content objects that are associated together with a group of content objects that includes the displayed content object.

7. A head-mounted-device (HMD) system comprising:
at least one processor; and
data storage comprising logic executable by the at least one processor to:
detect an extent to which the HMD is tilted along a first axis;
make a first determination that the detected extent is greater than or equal to a threshold extent and that the detected extent is not greater than or equal to a second threshold extent;
based on the first determination, apply a first manipulative action to a displayed content object, wherein the first manipulative action is applied to a degree corresponding to the detected extent to which the HMD is tilted along the first axis;
make a second determination that the detected extent is greater than or equal to the second threshold extent; and based on the second determination, display the displayed content object with no manipulative action.

8. The system of claim 7, wherein the detected extent to which the HMD is tilted along the first axis comprises an angle between (i) a direction in which the HMD is facing during a first state, and (ii) a direction in which the HMD is facing during a second state.

9. The system of claim 7, wherein the degree to which the first manipulative action is applied is a speed at which the first manipulative action is applied.

10. The system of claim 7, wherein the displayed content is displayed within a graphical user interface displayed on a display of the HMD.

11. The system of claim 7, wherein the logic is further executable by the at least one processor to:
receive data that indicates a second axis along which the HMD is tilted;
receive data that indicates an extent to which at least a portion of the HMD is tilted along the second axis; and
based on the indicated second axis, apply a second manipulative action to the displayed content object,
wherein the second manipulative action is applied to a degree corresponding to the indicated extent to which the HMD is tilted along the second axis.

12. The system of claim 11, wherein the logic is further executable to apply the second manipulative action to the displayed content object while applying the first manipulative action to the displayed content object.

13. The system of claim 11, wherein the logic is further executable to apply the second manipulative action to the displayed content object subsequent to applying the first manipulative action to the displayed content object.

14. The system of claim 7, wherein the first manipulative action comprises at least one of:
(a) zooming the displayed content object;
(b) scrolling the displayed content object;
(c) panning on the displayed content object;
(d) enlarging the displayed content object;
(e) shrinking the displayed content object;
(f) rotating the displayed content object;
(g) moving the displayed content object;
(h) switching from the displayed content object to a new content object to display; and
(i) cycling between displaying content objects that are associated together with a group of content objects that includes the displayed content object.

15. The system of claim 7, wherein the logic is further executable to, based on the second determination, undo any manipulative action applied to the displayed content object.

16. A computer-implemented method comprising:
receiving data that indicates a first axis along which the HMD is tilted;
receiving data that indicates a second axis along which the HMD is tilted, wherein the data further indicates that the HMD is tilted along the second axis at the same time as the HMD is tilted along the first axis;
receiving data that indicates an extent to which the HMD is tilted along the first axis;
receiving data that indicates an extent to which the HMD is tilted along the second axis;
based on the indicated first axis, applying at least one first manipulative action to a displayed content object during the entire time that the HMD is tilted to at least a threshold extent along the first axis, wherein the at least one manipulative action is applied to a degree corresponding to the indicated extent to which the HMD is tilted along the first axis; and
based on the indicated second axis, applying at least one second manipulative action to the displayed content object during the entire time that the HMD is tilted to at least a threshold extent along the second axis, wherein the at least one second manipulative action is applied to a degree corresponding to the indicated extent to which the HMD is tilted along the second axis and applied concurrently with the application of the first manipulative action.

17. The method of claim 16, wherein the measured extent to which the HMD is tilted along the first axis comprises an angle between (i) a direction in which the HMD is facing during a first state, and (ii) a direction in which the HMD is facing during a second state.

18. The method of claim 16,
wherein the degree to which the at least one first manipulative action is applied is a speed at which the at least one first manipulative action is applied, and
wherein the degree to which the at least one second manipulative action is applied is a speed at which the at least one second manipulative action is applied.

19. The method of claim 16, wherein the displayed content object is displayed within a graphical user interface displayed on a display of the HMD.

20. The method of claim 16, wherein each of the at least one first manipulative action and the at least one second manipulative action comprises at least one of:
(a) zooming the displayed content object;
(b) scrolling the displayed content object;
(c) panning on the displayed content object;
(d) enlarging the displayed content object
(e) shrinking the displayed content object;
(f) rotating the displayed content object;
(g) moving the displayed content object;
(h) switching from the displayed content object to a new content object to display; and
(i) cycling between displaying content objects that are associated together with a group of content objects that includes the displayed content object.

21. A non-transitory computer readable medium (CRM) having stored thereon instructions executable by a computing device to cause the computing device to perform functions comprising:
receiving data that indicates a first axis along which a head-mounted device (HMD) is tilted;
receiving data that indicates a second axis along which the HMD is tilted, wherein the data further indicates that the HMD is tilted along the second axis at the same time as the HMD is tilted along the first axis;
receiving data that indicates an extent to which the HMD is tilted along the first axis;
receiving data that indicates an extent to which the HMD is tilted along the second axis;
based on the indicated first axis, applying at least one first manipulative action to a displayed content object during the entire time that the HMD is tilted to at least a threshold extent along the first axis, wherein the at least one manipulative action is applied to a degree corresponding to the indicated extent to which the HMD is tilted along the first axis; and
based on the indicated second axis, applying at least one second manipulative action to the displayed content object during the entire time that the HMD is tilted to at least a threshold extent along the second axis, wherein the at least one second manipulative action is applied to a degree corresponding to the indicated extent to which the HMD is tilted along the second axis and applied concurrently with the application of the first manipulative action.

22. The CRM of claim 21, wherein the indicated extent to which the HMD is tilted along the first axis comprises an angle between (i) a direction in which the HMD is facing during a first state, and (ii) a direction in which the HMD is facing during a second state.

23. The CRM of claim 21,
wherein the degree to which the at least one first manipulative action is applied is a speed at which the at least one first manipulative action is applied, and
wherein the degree to which the at least one second manipulative action is applied is a speed at which the at least one second manipulative action is applied.

24. The CRM of claim 21, wherein the displayed content object is displayed within a graphical user interface displayed on a display of the HMD.

25. The CRM of claim 21, wherein each of the at least one first manipulative action and the at least one second manipulative action comprises at least one of:
  (a) zooming the displayed content object;
  (b) scrolling the displayed content object;
  (c) panning on the displayed content object;
  (d) enlarging the displayed content object
  (e) shrinking the displayed content object;
  (f) rotating the displayed content object;
  (g) moving the displayed content object;
  (h) switching from the displayed content object to a new content object to display; and
  (i) cycling between displaying content objects that are associated together with a group of content objects that includes the displayed content object.

26. A non-transitory computer readable medium (CRM) having stored thereon instructions executable by a computing device to cause the computing device to perform functions comprising:
  detecting an extent to which a head-mounted device (HMD) is tilted along a first axis;
  making a first determination that the detected extent is greater than or equal to a threshold extent and that the detected extent is not greater than or equal to a second threshold extent;
  based on the first determination, applying a first manipulative action to a displayed content object, wherein the first manipulative action is applied to a degree corresponding to the detected extent to which the HMD is tilted along the first axis;
  making a second determination that the detected extent is greater than or equal to the second threshold extent; and
  based on the second determination, displaying the displayed content object with no manipulative action.

27. The CRM of claim 26, wherein the detected extent to which the HMD is tilted along the first axis comprises an angle between (i) a direction in which the HMD is facing during a first state, and (ii) a direction in which the HMD is facing during a second state.

28. The CRM of claim 26, wherein the degree to which the first manipulative action is applied is a speed at which the first manipulative action is applied.

29. The CRM of claim 26, wherein the displayed content is displayed within a graphical user interface displayed on a display of the HMD.

30. The CRM of claim 26, wherein the functions further comprise:
  receiving data that indicates a second axis along which the HMD is tilted;
  receiving data that indicates an extent to which at least a portion of the HMD is tilted along the second axis; and
  based on the indicated second axis direction, applying a second manipulative action to the displayed content object,
  wherein the second manipulative action is applied to a degree corresponding to the indicated extent to which the HMD is tilted along in the second axis.

31. The CRM of claim 30, wherein the functions further comprise:
  applying the second manipulative action to the displayed content object while applying the first manipulative action to the displayed content object.

32. The CRM of claim 30, wherein the further comprise:
  applying the second manipulative action to the displayed content object subsequent to applying the first manipulative action to the displayed content object.

33. The CRM of claim 26, wherein the first manipulative action comprises at least one of:
  (a) zooming the displayed content object;
  (b) scrolling the displayed content object;
  (c) panning on the displayed content object;
  (d) enlarging the displayed content object;
  (e) shrinking the displayed content object;
  (f) rotating the displayed content object;
  (g) moving the displayed content object;
  (h) switching from the displayed content object to a new content object to display; and
  (i) cycling between displaying content objects that are associated together with a group of content objects that includes the displayed content object.

34. The CRM of claim 26, wherein the functions further comprise:
  based on the second determination, undoing any manipulative action applied to the displayed content object.

* * * * *